(12) United States Patent
Nancekievill et al.

(10) Patent No.: US 7,370,180 B2
(45) Date of Patent: May 6, 2008

(54) BIT FIELD EXTRACTION WITH SIGN OR ZERO EXTEND

(75) Inventors: Alexander Edward Nancekievill, Great Abington (GB); David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 592 days.

(21) Appl. No.: 10/793,954

(22) Filed: Mar. 8, 2004

(65) Prior Publication Data
US 2005/0198474 A1 Sep. 8, 2005

(51) Int. Cl.
*G06F 9/00* (2006.01)
*G06F 9/44* (2006.01)
*G06F 15/00* (2006.01)
*G06F 17/10* (2006.01)

(52) U.S. Cl. .................................. 712/223; 708/300
(58) Field of Classification Search ............. 712/223; 708/300
See application file for complete search history.

(56) References Cited
OTHER PUBLICATIONS

Computer Organization and Design by Patterson and Hennessy.*

* cited by examiner

*Primary Examiner*—Eddie Chan
*Assistant Examiner*—Brian Johnson
(74) *Attorney, Agent, or Firm*—Nixon & Vanderhye P.C.

(57) ABSTRACT

A method of controlling data processing logic which causes a data value to be rotated by a number of bits in order to generate a rotated data value; a number of least significant bits of the rotated data value are masked with other bits of said rotated data value not being masked in order to generate a masked rotated data value; a selected bit of said rotated data value are masked with other bits of said rotated data value not being masked in order to generate a bit preset rotated data value; and said sign-extended bit field extracted data value to be generated by subtracting said masked rotated data value from said bit preset data value or said zero-extended bit field extracted data value to be generated by performing a logical exclusive-OR operation with the masked rotated data value and said bit preset data value.

29 Claims, 6 Drawing Sheets

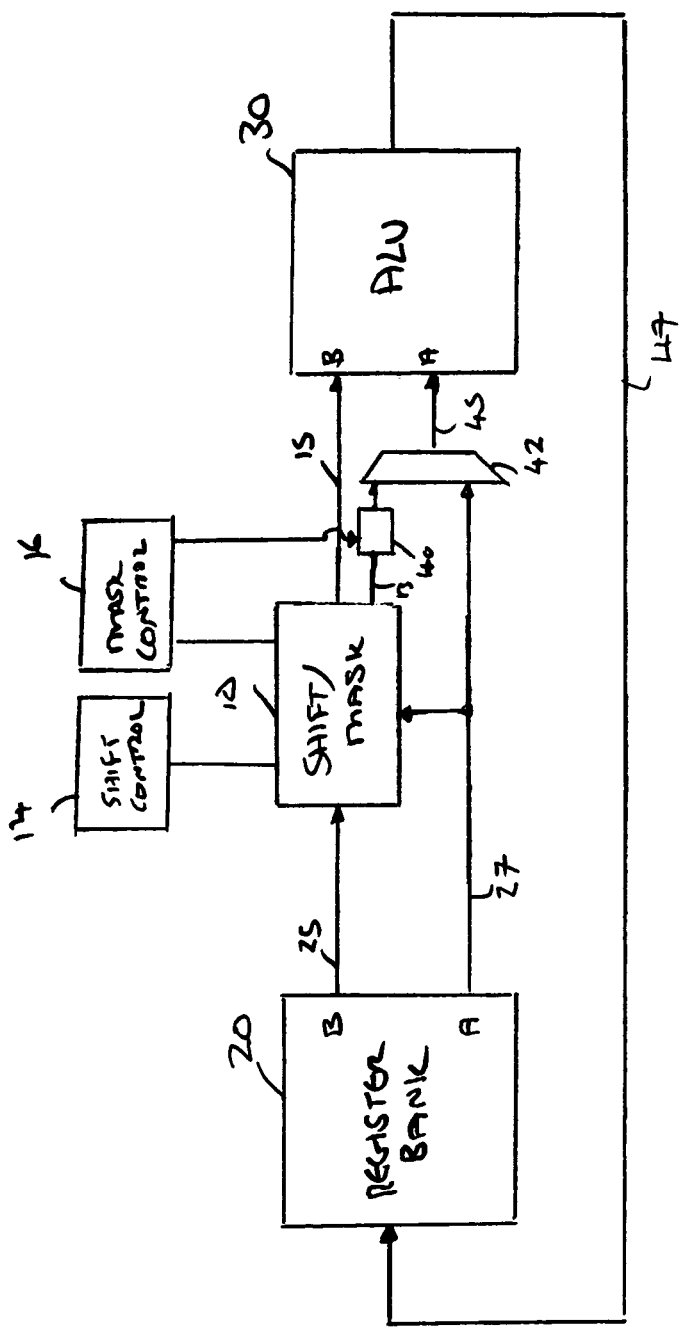

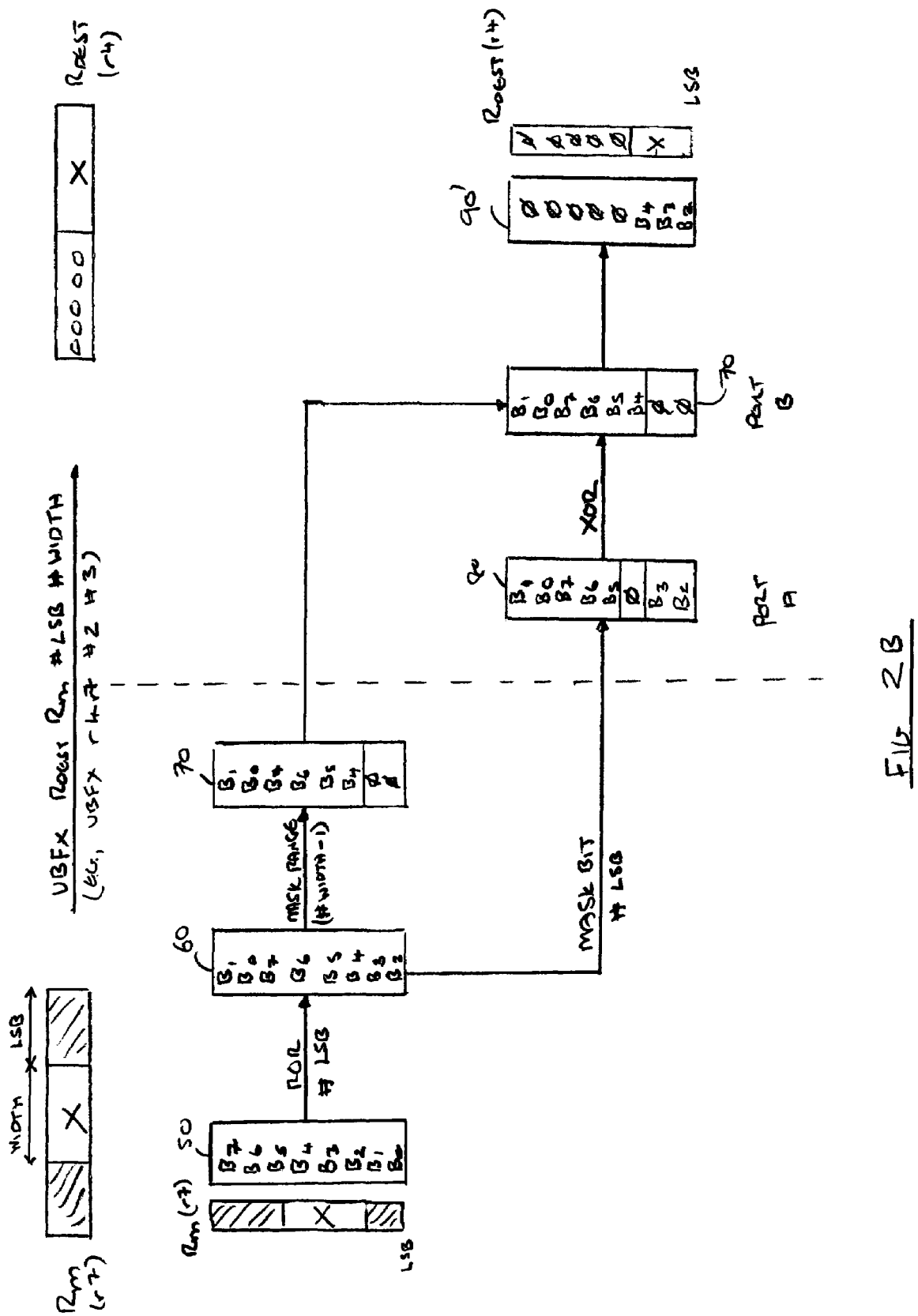

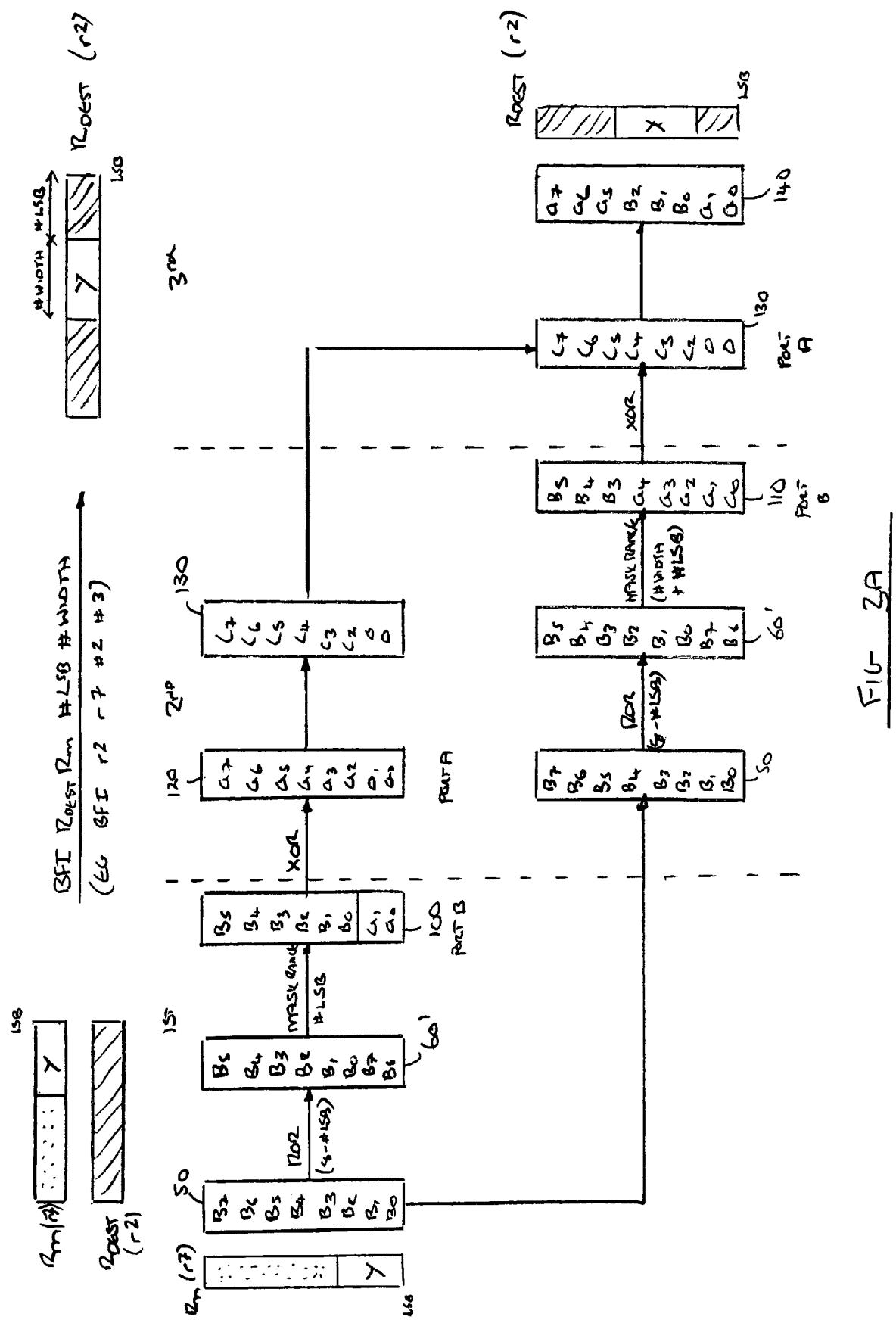

BIT FIELD EXTRACTION WITH SIGN OR ZERO EXTEND

BACKGROUND OF THE INVENTION

1. Field of the Invention

The present invention relates to bit field manipulation, and in particular to techniques for bit field extraction and bit field insertion.

2. Description of the Prior Art

Bit field manipulation techniques are known. These techniques are typically employed by a data processing apparatus when seeking to manipulate predetermined bits of a data value. Typical examples of bit field manipulation techniques include bit field insertion operations and bit field extraction operations.

In a bit field extraction operation, a data value is provided and the data processing apparatus is arranged, in response to a bit field extract instruction, to extract a predetermined sequence of bits from that data value. The extracted data bits can then be used thereafter in subsequent data processing operations. For example, a typical bit field extraction instruction may cause bit 3 to bit 10 (i.e. 8 sequential bits) to be extracted from a 32 bit data value and make the extracted data bits to be available for subsequent data processing operations.

In a typical bit field insertion operation, a predetermined sequence of bits from one data value is inserted into another data value. For example, a typical bit field insertion instruction may cause an 8 bit data value to be inserted into a 32 bit data value starting at bit 3 of the 32 bit data value and make the resultant data value available for subsequent data processing operations.

It will be appreciated that these two operations enable a wide range of useful data manipulation operations to be performed on data values.

In order to support these bit field manipulation operations, the data processing apparatus typically is provided with dedicated hardware arranged to perform such operations. When a bit field manipulation operation is required, the data processing apparatus will pass the data values to be manipulated to that dedicated hardware in order to perform the particular operation required. Typically, the bit field manipulated data value will then be returned to the data processing apparatus for subsequent operations.

It is desired to provide an improved technique for performing such bit field manipulation operations.

SUMMARY OF THE INVENTION

According to a first aspect of the present invention there is provided a data processing apparatus comprising: data processing logic operable to perform data processing operations on at least one data value; and instruction decode logic operable in response to a bit field extraction instruction, which enables a predetermined sequence of bits from the at least one data value to be provided as a sign-extended bit field extracted data value, to control the data processing logic to cause: the at least one data value to be rotated by a number of bits in order to generate a rotated data value; a number of least significant bits of the rotated data value to be masked in order to generate a masked rotated data value; a selected bit of the rotated data value to be masked in order to generate a bit preset rotated data value; and the sign-extended bit field extracted data value to be generated as a result of an operation which has the effect of subtracting the masked rotated data value from the bit preset data value.

According to a second aspect of the present invention there is provided a data processing apparatus comprising: data processing logic operable to perform data processing operations on at least one data value; and instruction decode logic operable in response to a bit field extraction instruction, which enables a predetermined sequence of bits from the at least one data value to be provided as a zero-extended bit field extracted data value, to control the data processing logic to cause: the at least one data value to be rotated by a number of bits in order to generate a rotated data value; a number of least significant bits of the rotated data value to be masked in order to generate a masked rotated data value; a selected bit of the rotated data value to be masked in order to generate a bit preset rotated data value; and the zero-extended bit field extracted data value to be generated as a result of an operation which has the effect of performing a logical exclusive-OR operation with the masked rotated data value and the bit preset data value.

Accordingly, a bit field extracted data value can readily be provided in sign-extended or zero-extended form through the provision of an elegant combination of a rotation operation, a masking operation and either a subtraction operation or an exclusive-OR operation.

It will be appreciated that a sign-extended form is a form where the most significant bit of the bit field extracted data value is replicated to pad higher bit positions of the bit field extracted data value. This replication is achievable because the rotated and masked data values have been provided in a suitable form to exploit the property of addition and subtraction operations where a carry bit from a given bit position affects all result bits above it.

It will be appreciated that a zero-extended form is a form where the bit field extracted data value is padded with zeros. Again, this is possible because the operands of the logical exclusive-OR operation have been provided in a suitable form to exploit the property of exclusive-OR operations where identical bits in two data values are set to zero.

Hence, it will be appreciated that the bit field extracted data value can be provided in either sign extended or zero extended form, using the same source operands, simply by changing the final arithmetic operation to be performed on those operands.

The present invention recognises that in many data processing apparatus embodiments, functionality may already exist to support this combination of operations. Accordingly, instead of having to provide additional, dedicated hardware which would be activated when a bit field extract operation is required, the existing data processing logic can instead be utilised with only relatively minor modifications. Utilising the existing data processing logic has many advantages. Firstly, this obviates the need to provide further additional, dedicated logic in the data processing apparatus to perform the particular operations, which reduces power consumption and can decrease the overall cost and complexity of the hardware. Secondly, by performing such operations using existing logic, bit field extraction instructions can be provided without affecting the maximum clock frequency of the data processing apparatus.

It will be appreciated that rotating the at least one data value by a number of bits advantageously arranges the bits in the data value in a suitable order for the subsequent operations. Similarly, masking the rotated data value is a convenient way to manipulate that data value such that a simple subtraction operation or an exclusive-OR operation can thereafter be performed in order to directly generate the bit field extracted data value.

It will also be appreciated that masking is a technique whereby selected bits of a data value can be preset to particular values. For example, masking may result in selected bits being either set or cleared (i.e. set to either a logical '1' or '0'). Alternatively, masking may result in selected bits being set to values of bits of a corresponding data value (i.e. those bits being effectively replaced with corresponding bits of the other data value). As mentioned previously, this combination of operations can readily be supported by existing hardware functionality already provided in many data processing apparatus in order to generate the bit field extracted data value.

Presetting a selected bit of the rotated data value provides a convenient technique for enabling a number of bit field extract operations to be performed thereafter just using a simple arithmetic or logical operation.

In one embodiment, the at least one data value comprises 'n' bits and the predetermined sequence of bits comprises 'p' sequential bits of the 'n' bits, wherein 'p' and 'n' are positive integers.

Hence, a subset of the total number of bits making up the at least one data value can be the subject of the bit field extract operation.

In one embodiment, the predetermined sequence comprises an '$m^{th}$' and subsequent 'p' minus 1 bits of the 'n' bits, wherein 'm' is a positive integer.

In one embodiment, the at least one data value is rotated by 'm' bits in order to generate the rotated data value.

Rotating the data value is a convenient mechanism to align the data bits in a predetermined order for subsequent operations.

In one embodiment, the at least one data value is rotated right by 'm' bits in order to generate the rotated data value.

In one embodiment, the at least one data value is rotated left by 'n' minus 'm' bits in order to generate the rotated data value.

It will be appreciated that rotating the at least one data value right by 'm' bits is equivalent to rotating the same data value left by 'n' minus 'm' bits.

In one embodiment, 'm' is specified by a bit number field of the bit field extract instruction.

In one embodiment, the rotated data value is generated by an operation which has the effect of rotating the at least one data value right by 'm' bits.

In one embodiment, 'p' minus 1 least significant bits of the rotated data value are masked in order to generate the masked rotated data value.

In one embodiment, the 'p' minus 1 least significant bits of the rotated data value are preset to a particular value in order to generate the masked rotated data value.

In one embodiment, the 'p' minus 1 least significant bits of the rotated data value are cleared.

In one embodiment, the 'p' minus 1 least significant bits of the rotated data value are cleared in order to generate the masked rotated data value.

Hence, the masking operation causes the 'p' minus one least significant bits to be reset to a logical zero value which provides the masked rotated data value in a suitable form for performing a subsequent arithmetic or logical operation thereafter in order to extract the required bit field data value.

In one embodiment, the selected bit of the rotated data value is the '$p'^{th}$' least significant bit of the rotated data value which is preset to a particular value in order to generate the bit preset rotated data value.

In one embodiment, the "p" least significant bit of the selected bit of the rotated data value is cleared.

In one embodiment, 'p' is specified by a width field of the bit field extract instruction.

In one embodiment, the selected bit of the rotated data value is the '$p'^{th}$' least significant bit of the rotated data value which is cleared in order to generate the bit preset rotated data value.

In one embodiment, the bit field extract instruction specifies that the bit field extracted data value is to be provided in a sign-extended form and the arithmetic operation comprises a subtract operation.

In one embodiment, the bit field extract instruction specifies that the bit field extracted data value is to be provided in a zero-extended form and the arithmetic operation comprises a logical exclusive-OR operation.

According to a third aspect of the present invention there is provided a data processing apparatus comprising: data processing logic operable to perform data processing operations on at least two data values; and instruction decode logic operable in response to a bit field insertion instruction, which enables a predetermined sequence of bits from a first of the at least two data values to be inserted into a second of the at least two data values in order to generate a bit field inserted data value, to control the data processing logic to cause: the first of the at least two data values to be rotated by a number of bits in order to generate a rotated data value; a number of least significant bits of the rotated data value to be masked in order to generate a first masked rotated data value; an intermediate data value to be generated as a result of an operation which has the effect of performing an exclusive-OR operation on the first masked rotated data value and the second of the at least two data values; a number of least significant bits of the rotated data value to be masked in order to generate a second masked rotated data value; and the bit field inserted data value to be generated as a result of an operation which has the effect of performing an exclusive-OR operation on the second masked rotated data value and the intermediate data value.

Accordingly, a bit field inserted data value can readily be provided through the provision of an elegant combination of rotation operations, masking operations and logical operations. In particular, the present invention makes use of the reversible nature of exclusive-OR operations. The intermediate data value is arranged to provide many of the bits for the bit field inserted data value at the correct bit locations, but many of these bits are not available in their final form since they have been the subject of an exclusive-OR operation with the second of the at least two data values. However, the second exclusive-OR operation reverses the effect of the first exclusive-OR operation and generates the bit field inserted data value.

The present invention recognises that in many data processing apparatus embodiments, functionality may already exist to support this combination of operations. Accordingly, instead of having to provide additional, dedicated hardware which would be activated when a bit field insertion operation is required, the existing data processing logic can instead be utilised with only relatively minor modifications. Utilising the existing data processing logic has many advantages. Firstly, this obviates the need to provide further additional dedicated logic in the data processing apparatus to perform the particular operations, which reduces power consumption and can decrease the overall cost and complexity of the hardware. Secondly, by performing such operations using existing logic, bit field insertion instructions can be provided without affecting the maximum clock frequency of the data processing apparatus.

It will be appreciated that rotating the first of the at least two data values by a number of bits advantageously arranges the bits in the data value in a suitable order for the subsequent operations. Similarly, masking the rotated data values is a convenient way to manipulate those data values such that simple logical operations can thereafter be performed in order to generate the bit field inserted data value.

It will be appreciated that masking is a technique whereby selected bits of a data value can be preset to particular values. For example, masking may result in selected bits being either set or cleared (i.e. set to either a logical '1' or '0'). Alternatively, masking may result in selected bits being set to values of bits of a corresponding data value (i.e. those bits are effectively replaced with corresponding bits of the other data value). As mentioned previously, this combination of operations can readily be supported by existing hardware functionality already provided in many data processing apparatus in order to generate the bit field inserted data value.

In one embodiment, the first of the at least two data values and the second of the at least two data values comprise 'n' bits and the predetermined sequence of bits comprises 'p' sequential bits of the 'n' bits, wherein 'p' and 'n' are positive integers.

Hence, a subset of the total number of bits making up the at least two data values can be the subject of the bit field insertion operation.

In one embodiment, the predetermined sequence comprises an '$m^{th}$' and subsequent 'p' minus 1 bits of the 'n' bits, wherein 'm' is a positive integer.

In one embodiment, the first of the at least two data values is rotated by 'm' bits in order to generate the rotated data value.

Rotating the first data of the at least two data values is a convenient mechanism to align the data bits in a predetermined order for subsequent operations.

In one embodiment, the first of the at least two data values is rotated right by 'm' bits in order to generate the rotated data value.

In one embodiment, the first of the at least two data values is rotated left by 'n' minus 'm' bits in order to generate the rotated data value.

It will be appreciated that rotating the first of the at least two data values right by 'm' bits is equivalent to rotating the same data value left by 'n' minus 'm' bits.

In one embodiment, 'm' is specified by a bit number field of the bit field extract instruction.

In one embodiment, the rotated data value is generated by an operation which has the effect of rotating the first of the at least two data values right by 'm' bits.

In one embodiment, 'p' least significant bits of the rotated data value are masked in order to generate the first masked rotated data value.

In one embodiment, the 'p' least significant bits of the rotated data value are preset to predetermined values in order to generate the first masked rotated data value.

In one embodiment, each of the 'p' least significant bits are preset to values of corresponding least significant bits of the second of the at least two data values.

In one embodiment, 'p' least significant bits of the rotated data value are preset to values of corresponding least significant bits of the second of the at least two data values in order to generate the first masked rotated data value.

Hence, the masking operation causes the 'p' least significant bits to replicate the values of the corresponding bits of the second of the at least two data values which provides the first masked rotated data value in a suitable form for performing a subsequent arithmetic operation thereafter in order to generate the intermediate data value.

In one embodiment, 'p' plus 'm' least significant bits of the rotated data value are masked in order to generate the second masked rotated data value.

In one embodiment, the 'p' plus 'm' least significant bits of the rotated data value are preset to predetermined values in order to generate the second masked rotated data value.

In one embodiment, each of the 'p' plus 'm' least significant bits are preset to values of corresponding least significant bits of the second of the at least two data values.

In one embodiment, 'p' plus 'm' least significant bits of the rotated data value are preset to values of corresponding least significant bits of the second of the at least two data values.

Hence, the masking operation causes the 'p' plus 'm' least significant bits to replicate the values of the corresponding bits of the second of the at least two data values which provides the second masked rotated data value in a suitable form for performing a subsequent arithmetic operation thereafter in order to generate the bit field inserted data value.

The particular masking operations used to generate the first masked rotated data value and the second masked rotated data values in combination with the exclusive-OR operation to generate the intermediate data value provides the second masked rotated data value and the intermediate data value with particular properties which can be exploited in order to generate the bit field inserted data value. Hence, the bit field inserted data value can be generated simply from those two operands using a simple exclusive-OR operation in order to reconstruct the required bits of the first of the least two data values and the second of the at least two data values.

According to a fourth aspect of the present invention there is provided a method of extracting a predetermined sequence of bits from at least one data value and providing the predetermined sequence of bits as a sign-extended bit field extracted data value, the method comprising the steps of: a) rotating the at least one data value by a number of bits in order to generate a rotated data value; b) masking a number of least significant bits of the rotated data value in order to generate a masked rotated data value; c) masking a selected bit of the rotated data value in order to generate a bit preset rotated data value; and d) generating the sign-extended bit field extracted data value as a result of an operation which has the effect of subtracting the masked rotated data value from the bit preset data value.

According to a fifth aspect of the present invention there is provided a method of extracting a predetermined sequence of bits from at least one data value and providing the predetermined sequence of bits as a zero-extended bit field extracted data value, the method comprising the steps of: a) rotating the at least one data value by a number of bits in order to generate a rotated data value; b) masking a number of least significant bits of the rotated data value in order to generate a masked rotated data value; c) masking a selected bit of the rotated data value in order to generate a bit preset rotated data value; and d) generating the zero-extended bit field extracted data value as a result of an operation which has the effect of performing an exclusive-OR operation using the masked rotated data value and the bit preset data value.

According to a sixth aspect of the present invention there is provided a method of inserting a predetermined sequence of bits from a first of at least two data values into a second of the at least two data values in order to generate a bit field inserted data value, the method comprising the steps of: a) rotating the first of the at least two data values a number of bits in order to generate a rotated data value; b) masking a number of least significant bits of the rotated data value in order to generate a first masked rotated data value; c) generating an intermediate data value as a result of an operation which has the effect of performing an exclusive-OR operation on the first masked rotated data value and the second of the at least two data values; d) masking a number of least significant bits of the rotated data value in order to generate a second masked rotated data value; and e) generating the bit field inserted data value as a result of an operation which has the effect of performing an exclusive-OR operation on the second masked rotated data value and the intermediate data value.

According to a seventh aspect of the present invention there is provided a computer program product having at least one bit field extraction instruction operable to cause a data processing apparatus to perform the method of the fourth aspect.

According to an eighth aspect of the present invention there is provided a computer program product having at least one bit field extraction instruction operable to cause a data processing apparatus to perform the method of the fifth aspect.

According to a ninth aspect of the present invention there is provided a computer program product having at least one bit field insertion instruction operable to cause a data processing apparatus to perform the method of the sixth aspect.

BRIEF DESCRIPTION OF THE DRAWINGS

The present invention will be described further, by way of example only, with reference to preferred embodiments thereof as illustrated in the accompanying drawings, in which:

FIG. 1 illustrates schematically a data processing apparatus of one embodiment arranged to perform bit field manipulation operations;

FIG. 3A illustrates a bit field insertion operation according to one embodiment; and FIG. 3B illustrates the operations of the data processing apparatus of FIG. 1 when performing the bit field insertion operation of FIG. 3A.

DESCRIPTION OF THE PREFERRED EMBODIMENTS

Figure 2A:
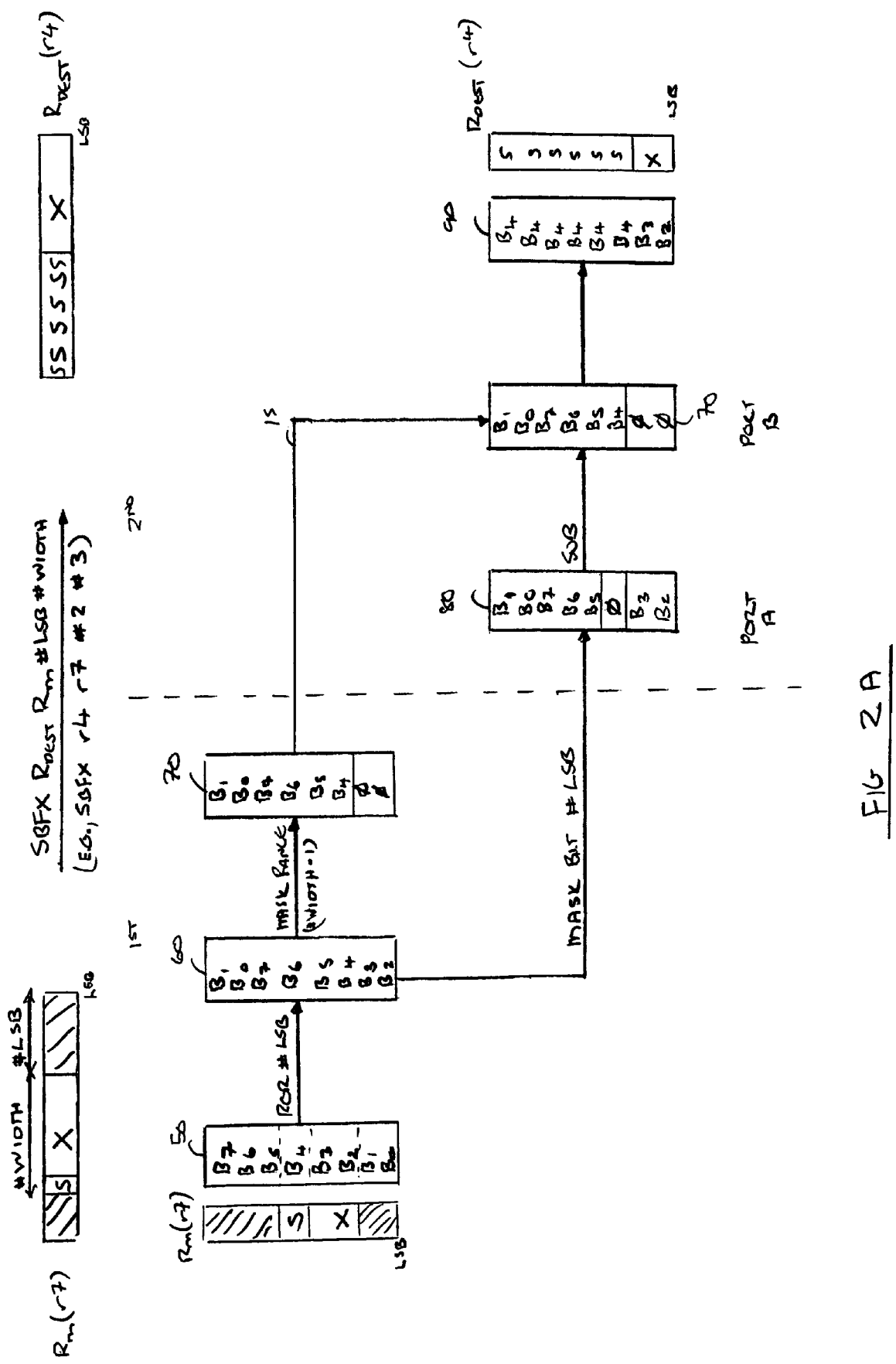
FIG. 2A illustrates a bit field extraction with sign extension operation according to one embodiment.

FIG. 1 illustrates schematically the arrangement of a data processing apparatus, generally 1, operable to perform bit field manipulation operations. The data processing apparatus 1 comprises a register bank 20, shift/mask logic 10, shift control logic 14, mask control logic 16, bit mask logic 40, a multiplexer 42 and an arithmetic/logic unit (ALU) 30.

Inputs of the shift/mask logic 10 are coupled to the register bank 20 via a bus 25 and a bus 27. The shift/mask logic 10 and the bit mask logic 40 are controlled by the shift control logic 14 and the mask control logic 16. The bit mask logic 40 is coupled to an output of the shift/mask logic 10 via a bus 13. The multiplexer 42 is coupled to an output of the bit mask logic 40 and to the register bank 20 via the bus 27. The ALU 30 is coupled at its B port to the shift/mask logic 10 via a bus 15, and at its A port to an output of the multiplexer 42 via a bus 45. An output of the ALU 30 is coupled to the register bank 20 via a bus 47.

The shift/mask logic 10 is provided with data values intended for the B port of the ALU 30. Once the required shift and/or mask operations have been performed by the shift/mask logic 10 this data value is provided to the ALU 30. Generally, data values intended for the A port of the ALU 30 are provided over the bus 27 to the multiplexer 42.

However, as will be described in more detail below, the multiplexer 42 is operable to provide a data value output from the bit mask logic 40 to the A port of the ALU 30 instead of a data value provided over the bus 27. Also, the shift/mask logic 10 is provided with the functionality to perform masking operations on the data value provided over the bus 25 using another data value provided over the bus 27. As will be clear from the discussion below, the presence of this additional functionality enables a number of bit field manipulation operations to be rapidly and efficiently performed.

FIG. 2A illustrates a bit field extraction operation with sign extension according to one embodiment. The instruction which causes the bit field extraction with sign extension operation to be performed is illustrated. The instruction takes the form:

SBFX $R_{DEST}$ $R_m$ #LSB #WIDTH, where:

SBFX is a mnemonic indicating a bit field extraction operation with sign extension;

$R_{DEST}$ indicates the destination register into which the sign extended bit field is to be stored;

$R_m$ indicates the source register containing the bit field;

LSB indicates the bit number in the source register from which the least significant bit of the bit field is stored (e.g. #0 would indicate that the least significant bit of the bit field was stored at $B_0$, whereas #6 would indicate that the least significant bit of the bit field was stored at $B_6$, etc); and

WIDTH indicates the width of the bit field.

As can be seen from the example operation in FIG. 2A (SBFX r4 r7 #2 #3), #WIDTH has the value 3 and #LSB has the value 2. This operation causes a bit field comprising the bits X (which correspond to bits $B_2$ and $B_3$) and the bit S (which corresponds to bit $B_4$) to be extracted from the source register $R_7$ and this bit field to be placed into the destination register $R_4$ in sign extended format (i.e. the bit $B_4$ is replicated for subsequent most significant bits in $R_4$).

Figure 2C:
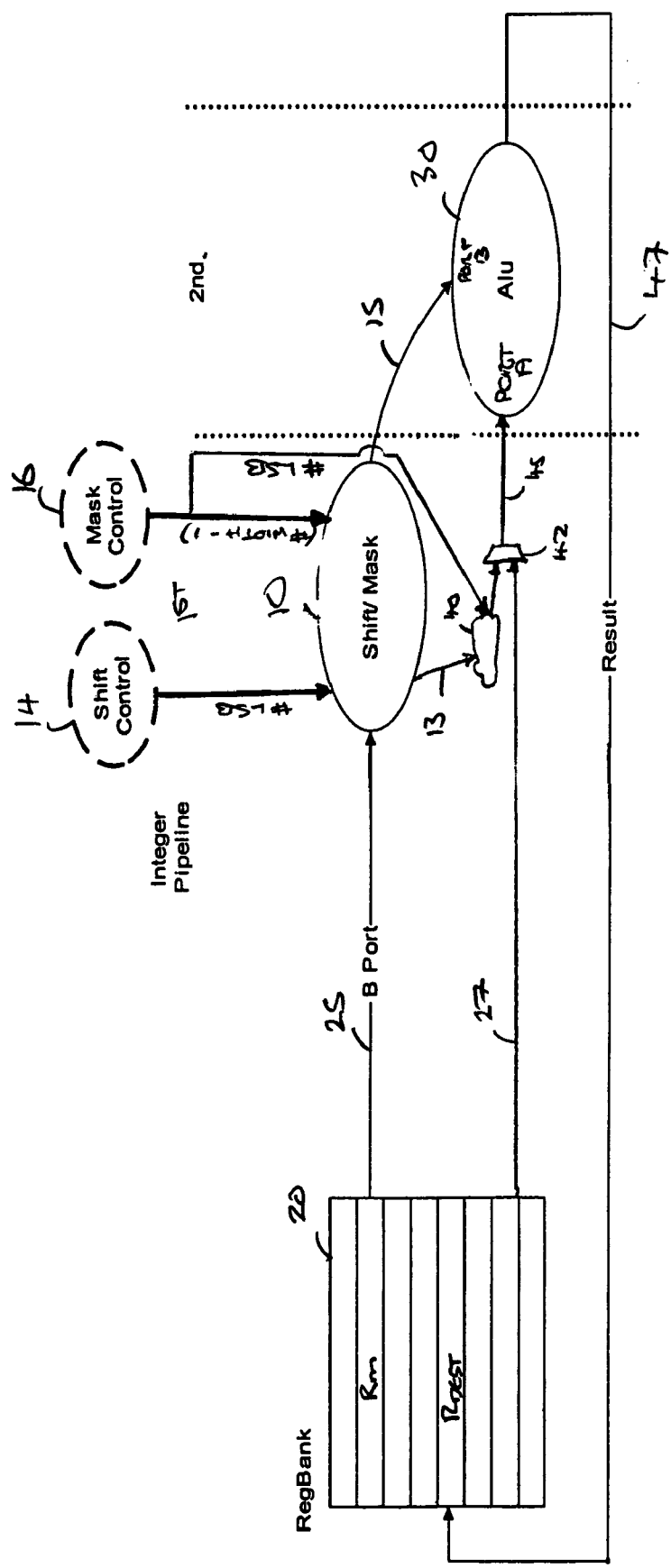
FIG. 2C illustrates the operation of the data processing apparatus of FIG. 1 when performing the bit field extraction operations illustrated in FIGS. 2A and 2B.

The operations performed by the data processing apparatus 1 in response to this instruction will now be described with reference to FIGS. 2A and 2C.

Firstly, the contents of the source register $R_7$ are provided in a first clock cycle over the bus 25 to shift/mask logic 10 from register bank 20. The data value 50 provided to the shift/mask logic 10 is illustrated in FIG. 2A.

The shift/mask logic 10, under the control of shift control logic 14, then performs a rotate right by the number of bits specified by the #LSB field of the instruction in order to produce a rotated data value 60. The shift/mask logic 10 then performs a mask operation under the control of the mask control logic 16. The mask operation causes a number of least significant bits of the rotated data value 60 to be masked. The number of least significant bits to be masked is determined by subtracting one from the value of the #WIDTH field. In this example, the masked bits are cleared (i.e. set to a logical zero). However, it will be appreciated that masking could take other forms. The masked rotated data value 70 is provided over the bus 15 to port B of the ALU 30.

The shift/mask logic 10 also outputs the rotated data value 60 over the path 13 to bit mask logic 40. The bit mask logic 40 receives the value of the #LSB field from the mask control logic 16 and generates a bit preset rotated data value 80. The bit preset rotated data value 80 comprises the rotated data value 60 in which the bit specified by the value of the #LSB field has been masked. In this example, the masking causes the selected data value to be cleared (i.e. that bit value to be set to a logical zero). The bit mask logic 40 outputs the bit preset rotated data value 80 to the multiplexer 42. The multiplexer 42 is controlled to select the output of the bit mask logic 40 and to provide this to the A port of the ALU 30 over the bus 45.

In the second clock cycle, the ALU 30 receives both the bit preset data value 80 and the masked rotated data value 70 and performs a subtraction operation to generate the bit field extracted data value 90.

Due to the various manipulations that have been performed in order to produce the bit preset rotated data value 80 and the masked rotated data value 70, the subtraction operation will automatically result in the most significant bits of the bit field being propagated, thereby causing sign extension.

For example, if the bit value $B_4$ is a zero, then the subtraction of zero from zero will result in a zero being placed in the corresponding bit position of $R_4$. Thereafter, each of the other bitwise subtractions will also result in a zero being placed in the corresponding MSB positions of $R_4$. Accordingly, sign extension will occur automatically.

Alternatively, if the bit value $B_4$ is a one, then the subtraction of zero from one will cause a borrow to occur which will result in the corresponding bit in $R_4$ to be set to a logical one. The borrow will propagate throughout the remaining MSBs of the data value and will cause all the remaining MSBs to also be set to the value one.

Figure 2B:
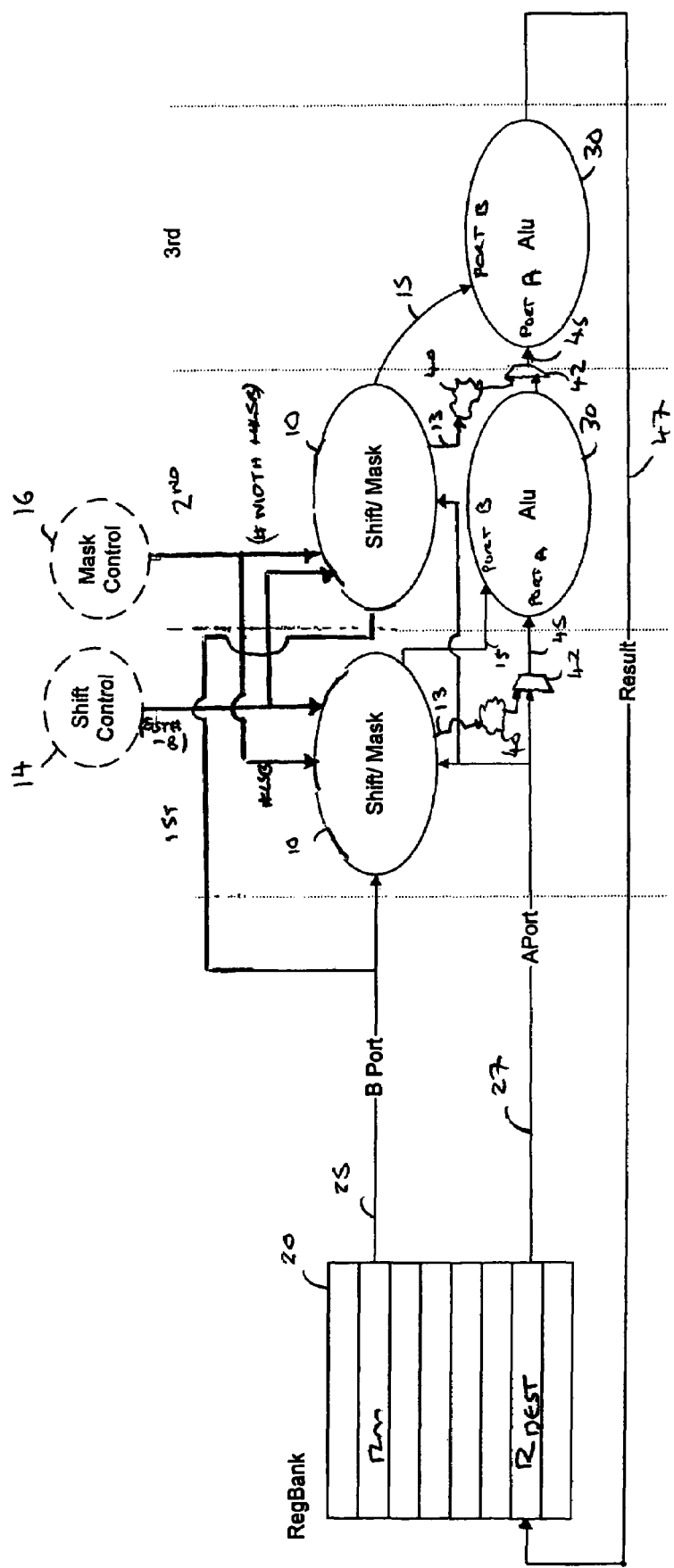
FIG. 2B illustrates a bit field extraction operation with zero extension according to one embodiment.

FIG. 2B illustrates a bit field extraction operation with zero extension according to one embodiment. The instruction which causes the bit field extraction with zero extension operation to be performed is illustrated. The instruction takes the form:

UBFX $R_{DEST}$ $R_m$ #LSB #WIDTH, where:

UBFX is a mnemonic indicating a bit field extraction operation with zero extension;

$R_{DEST}$ indicates the destination register into which the zero extended bit field is to be stored;

$R_m$ indicates the source register containing the bit field;

LSB indicates the bit number in the source register from which the least significant bit of the bit field is stored (e.g. #0 would indicate that the least significant bit of the bit field was stored at $B_0$, whereas #6 would indicate that the least significant bit of the bit field was stored at $B_6$, etc); and

WIDTH indicates the width of the bit field.

As can be seen from the example operation in FIG. 2B (UBFX r4 r7 #2#3), #WIDTH has the value 3 and #LSB has the value 2. This operation causes a bit field comprising the bits X (which correspond to bits $B_2$, $B_3$ and $B_4$) to be extracted from the source register $R_7$ and this bit field to be placed into the destination register $R_4$ in zero extended format (i.e. the bits in $R_4$ subsequent to most significant bit of the bit field are cleared to a logical '0').

The operations performed by the data processing apparatus 1 in response to this instruction will now be described with reference to FIGS. 2B and 2C.

Firstly, the contents of the source register $R_7$ are provided in a first clock cycle over the bus 25 to shift/mask logic 10 from register bank 20. The data value 50 provided to the shift/mask logic 10 is illustrated in FIG. 2B.

The shift/mask logic 10, under the control of shift control logic 14, then performs a rotate right by the number of bits specified by the #LSB field of the instruction in order to produce a rotated data value 60. The shift/mask logic 10 then performs a mask operation under the control of the mask control logic 16. The mask operation causes a number of least significant bits of the rotated data value 60 to be masked. The number of least significant bits to be masked is determined by subtracting one from the value of the #WIDTH field. In this example, the masked bits are cleared (i.e. set to a logical zero). However, it will be appreciated that masking could take other forms. The masked rotated data value 70 is provided over the bus 15 to port B of the ALU 30.

The shift/mask logic 10 also outputs the rotated data value 60 over the path 13 to bit mask logic 40. The bit mask logic 40 receives the value of the #LSB field from the mask control logic 16 and generates a bit preset rotated data value 80. The bit preset rotated data value 80 comprises the rotated data value 60 in which the bit specified by the value of the #LSB field has been masked. In this example, the masking causes the selected data value to be cleared (i.e. that bit value to be set to a logical zero). The bit mask logic 40 outputs the bit preset rotated data value 80 to the multiplexer 42. The multiplexer 42 is controlled to select the output of the bit mask logic 40 and to provide this to the A port of the ALU 30 over the bus 45.

In the second clock cycle, the ALU 30 receives both the bit preset data value 80 and the masked rotated data value 70 and performs an exclusive-OR operation to generate the bit field extracted data value 90'.

Due to the various manipulations that have been performed in order to produce the bit preset rotated data value 80 and the masked rotated data value 70, the exclusive-OR operation will automatically result in the most significant bits subsequent to the most significant bit of the bit field being cleared to a logical zero, thereby causing zero extension.

For example, if the bit value $B_5$ is a zero, then a exclusive-OR operation with $B_5$ (zero) will result in a zero being placed in the corresponding bit position of $R_4$.

Alternatively, if the bit value $B_5$ is a one, then a exclusive-OR operation with $B_5$ (one) will also result in a zero being placed in the corresponding bit position of $R_4$.

Accordingly, it can be seen that by simply using existing shift, mask, and arithmetic or logic operations, bit field extraction operations can be provided.

It can also be seen that these embodiments provides a simple solution to a complicated operation in just two processing cycles. It can also be seen that using the symmetric behaviour of the hardware, sign and zero extension can be provided.

Whilst the bit field reset logic 40 has been illustrated separately from the shift/mask logic 10, it will be appreciated that this functionality could instead be provided within the shift/mask logic 10. Accordingly, it can be seen that by building on the existing functionality no undue delay is introduced when performing these operations and only a minimal increase in hardware is required.

FIG. 3A illustrates a bit field insertion operation according to one embodiment. The instruction which causes the bit field insertion operation to be performed is illustrated. The instruction takes the form:

BFI $R_{DEST}$ $R_m$ #LSB #WIDTH, where:

BFI is a mnemonic indicating a bit field insertion operation;

$R_{DEST}$ indicates the destination register into which the bit field is to be inserted;

$R_m$ indicates the source register containing the bit field;

LSB indicates the bit number in the destination register from which the least significant bit of the bit field should be placed (e.g. #0 would indicate that the least significant bit of the bit field should be placed at $B_0$, whereas #6 would indicate that the least significant bit of the bit field should be placed at $B_6$, etc); and

WIDTH indicates the width of the bit field.

As can be seen from the example in FIG. 3A (BFI r2 r7 #2#3), #LSB has the value 2 and #WIDTH has the value 3. This operation causes a bit field comprising the bits Y (which correspond to bits $B_0$, $B_1$, and $B_2$) from the source register $R_7$ to be inserted into the destination register $R_2$ after the $2^{nd}$ least significant bit. Prior to the operation occurring, the destination register $R_2$ contains bits $A_0$ to $A_7$.

The operations performed by the data processing apparatus 1 in response to this instruction will now be described with reference to FIGS. 3A and 3B.

Firstly, the contents of the source register $R_7$ are provided in a first clock cycle over the bus 25 to shift/mask logic 10 from register bank 20. The data value 50 provided to the shift/mask logic 10 is illustrated in FIG. 3A.

The shift/mask logic 10, under the control of shift control logic 14, then performs a rotate right by the size of the data value (in this example eight bits) minus the number of bits specified by the #LSB field of the instruction in order to produce a rotated data value 60'. The shift/mask logic 10 then performs a mask operation under the control of the mask control logic 16. The mask operation causes a number of least significant bits of the rotated data value 60' to be masked. The number of least significant bits to be masked is determined by the value of the #LSB field. In this example, the masked bits are set to be the same value as the corresponding bits in the destination register $R_2$, the contents of which are provided to the shift/mask logic 10 over the bus 27 (i.e. bits $B_6$ and $B_7$ in the rotated data value 60' are replaced with bits $a_0$ and $a_1$ respectively from the destination register $R_2$ to generate a first masked rotated data value 100). The first masked rotated data value 100 is provided over the bus 15 to port B of the ALU 30.

In the second clock cycle, the ALU 30 receives the first masked rotated data value 100 over the bus 15 at its B port, and the contents of the destination register $R_{DEST}$ over the bus 45 at its A port (the multiplexer 42 is controlled to couple the bus 27 to the bus 45). The data value 120 provided from the destination register $R_2$ is illustrated in FIG. 3A. The ALU 30 receives both the first masked rotated data value 100 and the data value 120 and performs a logical exclusive-OR operation to generate an intermediate data value 130 which is stored in the destination register $R_2$. Whilst the above describes that the intermediate data value 130 is stored in the destination register $R_2$, it will be appreciated that the intermediate data value 130 could instead be stored in another register or could simply be recirculated without storing by simply providing a further input to the multiplexer 42.

Also in the second clock cycle, the contents of the source register $R_7$ are provided in over the bus 25 to shift/mask logic 10 from register bank 20. The data value 50 provided to the shift/mask logic 10 is illustrated in FIG. 3A.

The shift/mask logic 10, under the control of shift control logic 14, then performs a rotate right by the size of the data value (in this example eight bits) minus the number of bits specified by the #LSB field of the instruction in order to produce a rotated data value 60'. The shift/mask logic 10 then performs a mask operation under the control of the mask control logic 16. The mask operation causes a number of least significant bits of the rotated data value 60' to be masked. The number of least significant bits to be masked is determined by the sum of the value of the #LSB field and the value of the #WIDTH field. In this example, the masked bits are set to be the same value as the corresponding bits in the destination register $R_2$, the contents of which are provided to the shift/mask logic 10 over the bus 27 (i.e. bits $B_6$, $B_7$, $B_0$, $B_1$ and $B_2$ in the rotated data value 60' are replaced with bits $a_0$ to $a_4$ respectively from the destination register $R_2$ to generate a second masked rotated data value 110). The second masked rotated data value 110 is provided over the bus 15 to port B of the ALU 30 for use in the third clock cycle.

In the third clock cycle, the ALU 30 receives the second masked rotated data value 110 over the bus 15 at its B port, and the intermediate data value 130 from the destination register $R_{DEST}$ over the bus 45 at its A port (the multiplexer 42 is controlled to couple the bus 27 to the bus 45). The ALU 30 then performs a logical exclusive-OR operation to generate an bit field inserted data value 140 which is stored in the destination register $R_{DEST}$.

Due to the various manipulations that have been performed in order to produce the second masked rotated data value 110 and the intermediate data value 130, the exclusive-OR operation will automatically result in the bit field inserted data value 140 being generated.

Accordingly, it can be seen that by simply using existing shift, mask, and logic operations, bit field insertion operations can be provided.

It can also be seen that this embodiment provides a simple solution to a complicated operation in just three processing cycles, but only two cycles of throughput due to pipelining.

Whilst, as mentioned above, this approach largely makes use of existing hardware, separate paths from the shift controller 14 and the mask controller 16 over which the various control signals are provided and the instruction is interlocked. Also, as mentioned above, the hardware is arranged so that the data values intended for the A port can be selected for use by the shift/mask logic 10. Furthermore, the instruction control logic is modified to permit the result of the first pipeline stage to be forwarded during the second clock cycle to the ALU stage.

Accordingly, it can be seen that by building on the existing functionality no undue delay is introduced when performing this operation and only a minimal increase in hardware is required.

Whilst the bit field insertion operations have been described with reference to exclusive-OR operations, it will be appreciated that similar results could be achieved by employing exclusive-NOR operations and inverting one input data value.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   data processing logic operable to perform data processing operations on at least one data value; and instruction decode logic operable in response to a bit field extraction instruction, which enables a predetermined sequence of bits from said at least one data value to be provided as a sign-extended bit field extracted data value, to control said data processing logic to cause:

said at least one data value to be rotated by a number of bits in order to generate a rotated data value;

a number of least significant bits of said rotated data value to be masked with other bits of said rotated data value not being masked in order to generate a masked rotated data value;

a selected bit of said rotated data value to be masked with other bits of said rotated data value not being masked in order to generate a bit preset rotated data value; and said sign-extended bit field extracted data value to be generated as a result of an operation which has the effect of subtracting said masked rotated data value from said bit preset data value.

2. The data processing apparatus of claim 1, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said rotated data value is generated by an operation which has the effect of rotating said at least one data value right by 'm' bits.

3. The data processing apparatus of claim 1, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein 'p' minus 1 least significant bits of said rotated data value are cleared in order to generate said masked rotated data value.

4. The data processing apparatus of claim 1, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said selected bit of said rotated data value is the 'p'$^{th}$ least significant bit of said rotated data value which is cleared in order to generate said bit preset rotated data value.

5. A data processing apparatus comprising:

data processing logic operable to perform data processing operations on at least one data value; and instruction decode logic operable in response to a bit field extraction instruction, which enables a predetermined sequence of bits from said at least one data value to be provided as a zero-extended bit field extracted data value, to control said data processing logic to cause:

said at least one data value to be rotated by a number of bits in order to generate a rotated data value;

a number of least significant bits of said rotated data value to be masked with other bits of said rotated data value not being masked in order to generate a masked rotated data value;

a selected bit of said rotated data value to be masked with other bits of said rotated data value not being masked in order to generate a bit preset rotated data value; and said zero-extended bit field extracted data value to be generated as a result of an operation which has the effect of performing a logical exclusive-OR operation with the masked rotated data value and said bit preset data value.

6. The data processing apparatus of claim 5, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said rotated data value is generated by an operation which has the effect of rotating said at least one data value right by 'm' bits.

7. The data processing apparatus of claim 5, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein 'p' minus 1 least significant bits of said rotated data value are cleared in order to generate said masked rotated data value.

8. The data processing apparatus of claim 5, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said selected bit of said rotated data value is the 'p'$^{th}$ least significant bit of said rotated data value which is cleared in order to generate said bit preset rotated data value.

9. A data processing apparatus comprising:

data processing logic operable to perform data processing operations on at least two data values; and instruction decode logic operable in response to a bit field insertion instruction, which enables a predetermined sequence of bits from a first of said at least two data values to be inserted into a second of said at least two data values in order to generate a bit field inserted data value, to control said data processing logic to cause:

said first of said at least two data values to be rotated by a number of bits in order to generate a rotated data value;

a number of least significant bits of said rotated data value to be masked in order to generate a first masked rotated data value;

an intermediate data value to be generated as a result of an operation which has the effect of performing an exclusive-OR operation on said first masked rotated data value and said second of said at least two data values;

a number of least significant bits of said rotated data value to be masked in order to generate a second masked rotated data value; and said bit field inserted data value to be generated as a result of an operation which has the effect of performing an exclusive-OR operation on said second masked rotated data value and said intermediate data value.

10. The data processing apparatus of claim 9, wherein said first of said at least two data values and said second of said at least two data values comprise 'n' bits, said predetermined sequence of bits comprises 'p' sequential bits of said 'n' bits, and said predetermined sequence comprises an 'm'$^{th}$ and subsequent 'p' minus 1 bits of said 'n' bits, wherein 'm' is a positive integer, wherein 'p', 'n' and 'm' are positive integers.

11. The data processing apparatus of claim 10, wherein said rotated data value is generated by an operation which has the effect of rotating said first of said at least two data values right by 'm' bits.

12. The data processing apparatus of claim 10, wherein 'p' least significant bits of said rotated data value are preset to values of corresponding least significant bits of said second of said at least two data values in order to generate said first masked rotated data value.

13. The data processing apparatus of claim 10, wherein 'p' plus 'm' least significant bits of said rotated data value are preset to values of corresponding least significant bits of said second of said at least two data values.

14. A method of extracting a predetermined sequence of bits from at least one data value and providing said predetermined sequence of bits as a sign-extended bit field extracted data value, said method comprising the steps of:
   a) rotating said at least one data value by a number of bits in order to generate a rotated data value;
   b) masking a number of least significant bits of said rotated data value with other bits of said rotated data value not being masked in order to generate a masked rotated data value;
   c) masking a selected bit of said rotated data value with other bits of said rotated data value not being masked in order to generate a bit preset rotated data value; and
   d) generating said sign-extended bit field extracted data value as a result of an operation which has the effect of subtracting said masked rotated data value from said bit preset data value.

15. The method of claim 14, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said step a) comprises the step of:
   generating said rotated data value using an operation which has the effect of rotating said at least one data value right by 'm' bits.

16. The method of claim 14, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said step b) comprises the step of:
   generating said masked rotated data value by clearing 'p' minus 1 least significant bits of said rotated data value.

17. The method claim, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said step c) comprises the step of:
   generating said bit preset rotated data value by clearing the 'p'$^{th}$ least significant bit of said rotated data value.

18. A method of extracting a predetermined sequence of bits from at least one data value and providing said predetermined sequence of bits as a zero-extended bit field extracted data value, said method comprising the steps of:
   a) rotating said at least one data value by a number of bits in order to generate a rotated data value;
   b) masking a number of least significant bits of said rotated data value with other bits of said rotated data value not being masked in order to generate a masked rotated data value;
   c) masking a selected bit of said rotated data value with other bits of said rotated data value not being masked in order to generate a bit preset rotated data value; and
   d) generating said zero-extended bit field extracted data value as a result of an operation which has the effect of performing an exclusive-OR operation using said masked rotated data value and said bit preset data value.

19. The method of claim 18, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said step a) comprises the step of:
   generating said rotated data value using an operation which has the effect of rotating said at least one data value right by 'm' bits.

20. The method of claim 18, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said step b) comprises the step of:
   generating said masked rotated data value by clearing 'p' minus 1 least significant bits of said rotated data value.

21. The method claim 18, wherein said at least one data value comprises 'n' bits, said predetermined sequence of bits comprises 'p' sequential bits of said 'n' bits and said predetermined sequence comprises an 'm'$^{th}$ bit of said 'n' bits and a subsequent 'p' minus 1 bits of said 'n' bits, wherein 'p', 'n' and 'm' are positive integers, and wherein said step c) comprises the step of:
   generating said bit preset rotated data value by clearing the 'p'$^{th}$ least significant bit of said rotated data value.

22. A method of inserting a predetermined sequence of bits from a first of at least two data values into a second of said at least two data values in order to generate a bit field inserted data value, said method comprising the steps of:
   a) rotating said first of said at least two data values a number of bits in order to generate a rotated data value;
   b) masking a number of least significant bits of said rotated data value in order to generate a first masked rotated data value;
   c) generating an intermediate data value as a result of an operation which has the effect of performing an exclusive-OR operation on said first masked rotated data value and said second of said at least two data values;
   d) masking a number of least significant bits of said rotated data value in order to generate a second masked rotated data value; and
   e) generating said bit field inserted data value as a result of an operation which has the effect of performing an exclusive-OR operation on said second masked rotated data value and said intermediate data value.

23. The method of claim 22, wherein said first of said at least two data values and said second of said at least two data values comprise 'n' bits, said predetermined sequence of bits comprises 'p' sequential bits of said 'n' bits, and said predetermined sequence comprises an 'm'$^{th}$ and subsequent 'p' minus 1 bits of said 'n' bits, wherein 'm' is a positive integer, wherein 'p', 'n' and 'm' are positive integers.

24. The method of claim 23, wherein said step a) comprises the step of:
   generating said rotated data value using operation which has the effect of rotating said first of said at least two data values right by 'm' bits.

25. The method of claim 23, wherein said step b) comprises the step of:
generating said first masked rotated data value by presetting 'p' least significant bits of said rotated data value to values of corresponding least significant bits of said second of said at least two data values.

26. The method of claim 23, wherein step d) comprises the step of:
generating said second masked rotated data value by presetting 'p' plus 'm' least significant bits of said rotated data value to values of corresponding least significant bits of said second of said at least two data values.

27. A computer program product comprising a computer readable storage medium containing computer readable instructions including at least one bit field extraction instruction operable to cause a data processing apparatus to perform the method as claimed in claim 14.

28. A computer program product comprising a computer readable storage medium containing computer readable instructions including at least one bit field extraction instruction operable to cause a data processing apparatus to perform the method as claimed in claim 18.

29. A computer program product comprising a computer readable storage medium containing computer readable instructions including at least one bit field insertion instruction operable to cause a data processing apparatus to perform the method as claimed in claim 22.

* * * * *